United States Patent
Torres et al.

(10) Patent No.: US 8,983,433 B2
(45) Date of Patent: Mar. 17, 2015

(54) NETWORK BASED ON DEMAND WIRELESS ROAMING

(71) Applicant: Cisco Technology, Inc., San Jose, CA (US)

(72) Inventors: Esteban Raul Torres, Danville, CA (US); Robert J. Friday, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 105 days.

(21) Appl. No.: 13/631,779

(22) Filed: Sep. 28, 2012

(65) Prior Publication Data

US 2014/0094142 A1    Apr. 3, 2014

(51) Int. Cl.
*H04W 12/06* (2009.01)

(52) U.S. Cl.
USPC ........ 455/411; 455/414.1; 455/436; 455/418; 455/450; 455/443; 370/310; 370/338; 370/230; 370/352; 370/341

(58) Field of Classification Search
CPC ..................................................... H04W 12/06
USPC ......... 455/422.1, 414.1, 41.2, 41.7, 418, 425, 455/426.1, 435.1, 435.2, 41.3, 436, 450, 455/443; 370/310, 310.2, 338, 328, 311, 370/348, 322
See application file for complete search history.

(56) References Cited

U.S. PATENT DOCUMENTS

| | | | |
|---|---|---|---|
| 7,116,988 B2 | 10/2006 | Dietrich et al. | |
| 7,340,247 B1 | 3/2008 | O'Hara, Jr. et al. | |
| 8,040,861 B2 | 10/2011 | Calhoun et al. | |
| 8,169,958 B2 | 5/2012 | Torres et al. | |
| 8,204,512 B2 | 6/2012 | Dietrich et al. | |
| 2009/0011773 A1* | 1/2009 | Balachandran et al. | ... 455/456.1 |
| 2009/0172798 A1 | 7/2009 | Upp | |
| 2011/0158090 A1* | 6/2011 | Riley et al. | ..................... 370/230 |
| 2011/0222523 A1 | 9/2011 | Fu et al. | |
| 2012/0196644 A1 | 8/2012 | Scherzer et al. | |
| 2012/0229499 A1* | 9/2012 | Tsao et al. | ..................... 345/619 |
| 2013/0012225 A1* | 1/2013 | Inoue et al. | ................. 455/452.2 |

FOREIGN PATENT DOCUMENTS

WO    WO 2009127238    10/2009

* cited by examiner

*Primary Examiner* — Babar Sarwar
(74) *Attorney, Agent, or Firm* — Cindy Kaplan

(57) ABSTRACT

In one embodiment, a method includes receiving at a network device, a request from a mobile device to connect to a wireless local area network, inserting mobile device and network attributes into the request, transmitting the request from the network device to an authentication proxy comprising a policy filter, and receiving a response to the request and offloading mobile data to the wireless local area network if the request is allowed. The policy filter is configured to filter requests received at the authentication proxy based on the attributes and a network policy for offloading mobile data to the wireless local area network. An apparatus and logic are also disclosed herein.

19 Claims, 3 Drawing Sheets

NETWORK BASED ON DEMAND WIRELESS ROAMING

TECHNICAL FIELD

The present disclosure relates generally to wireless networks, and more particularly, to wireless roaming.

BACKGROUND

There is a growing need for mobile data offloading from cellular networks due to the increase in mobile data traffic. Wi-Fi networks are increasingly used for offloading data from cellular networks. The number of Wi-Fi enabled mobile devices continues to grow and the number of Wi-Fi networks available for roaming is expected to increase. In conventional systems, network selection policy is client based and static. For example, a mobile device may always choose to use an available Wi-Fi network. However, many mobile operators only want to offload data to a Wi-Fi network if the cellular network is overloaded or not available.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
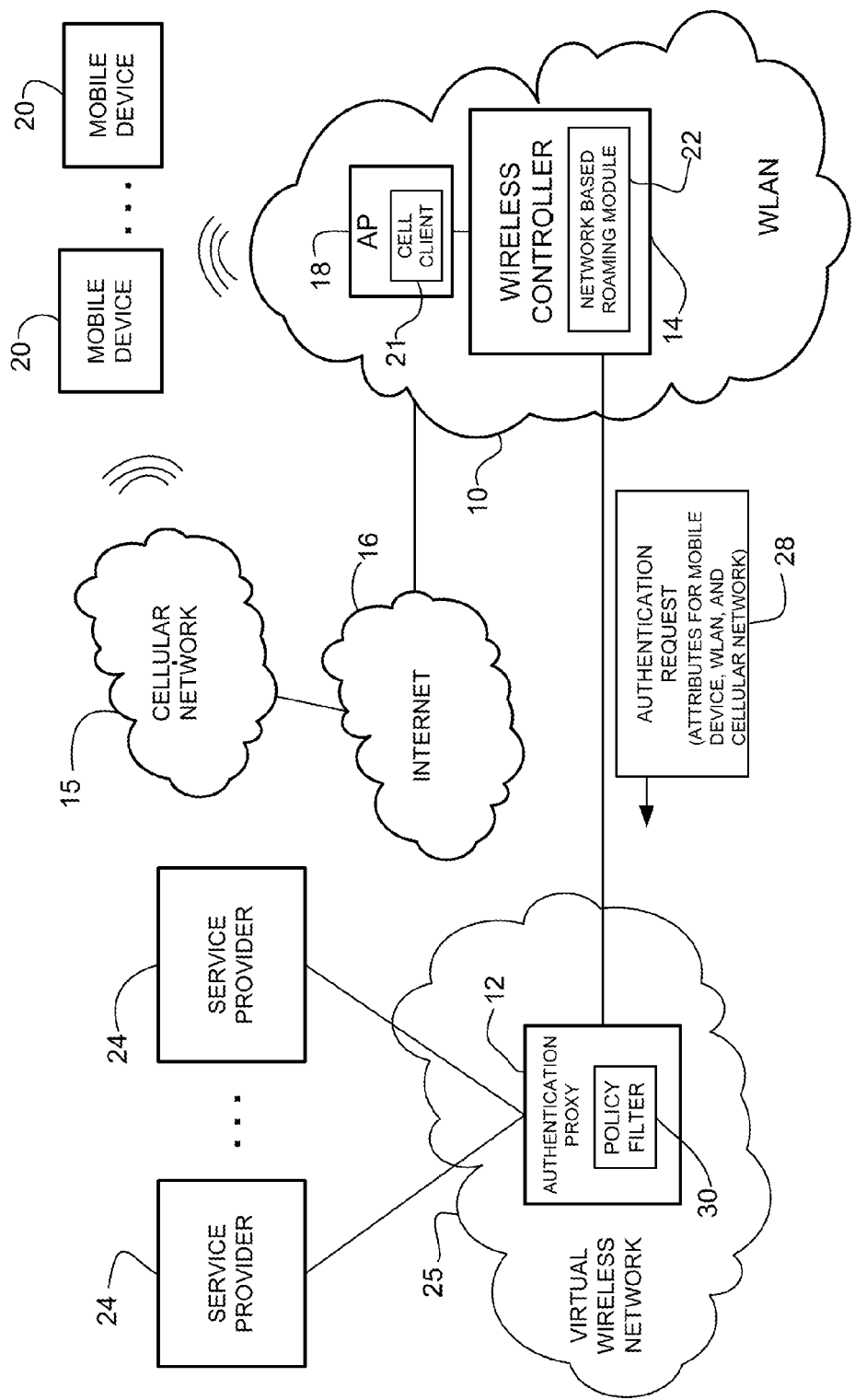
FIG. 1 illustrates an example of a network in which embodiments described herein may be implemented.

In one embodiment, a method generally comprises receiving at a network device, a request from a mobile device to connect to a wireless local area network, inserting mobile device and network attributes into the request, transmitting the request from the network device to an authentication proxy comprising a policy filter, and receiving a response to the request and offloading mobile data to the wireless local area network if the request is allowed. The policy filter is configured to filter requests received at the authentication proxy based on the attributes and a network policy for offloading mobile data to the wireless local area network.

In another embodiment, an apparatus generally comprises a network based roaming module for receiving a request from a mobile device to connect to a wireless local area network, inserting mobile device and network attributes into the request, transmitting the request to an authentication proxy comprising a policy filter, and receiving a response to the request and offloading mobile data to the wireless local area network if the request is allowed. The apparatus further includes memory for storing the attributes. The policy filter is configured to filter requests received at the authentication proxy based on the attributes and a network policy for offloading mobile data to the wireless local area network.

In yet another embodiment, an apparatus comprises an authentication proxy for receiving authentication requests from a wireless local area network, the requests comprising mobile device and network attributes, a policy filter configured to filter the requests based on the attributes and a network policy for offloading mobile data to the wireless local area network, and an interface for communication with a service provider node operable to authenticate the requests and set the network policy at the policy filter.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Network selection policy in conventional wireless systems is client based and static. Mobile voice clients have a static policy that defines a list of roaming partners to roam to when a home network is not available. When the list of roaming partners changes, the policy on the client needs to be updated, which can take a long time (e.g., up to a month). The policy cannot be dynamically configured by the mobile operator based on variables such as geographic location of client or time of day, or updated when wholesale roaming prices change without access to the mobile device.

When a mobile operator signs a roaming agreement with another operator (i.e., visited operator), the operator's devices roam to the visited operator anywhere in the region where the visited operator has coverage. This has not been a problem for cellular networks, because operators typically only do roaming agreements in regions where they do not have coverage. Thus, roaming was limited to areas where an operator does not have coverage. A problem arises with Wi-Fi because the Wi-Fi coverage of a visited operator may overlap with cellular coverage of the home operator. With the growing amount of Internet traffic going through mobile networks, operators often need to have access to more capacity in areas where they already have coverage.

Conventional mobile devices often choose the Wi-Fi network of the visited operator in the entire coverage area of the visited operator. In some geographic regions the home operator may have sufficient capacity and therefore not need to offload mobile data to the visited operator. The mobile device, however, will still choose to switch to the visited operator's Wi-Fi network, which results in the home operator paying a roaming fee when the offload from the cellular network to the Wi-Fi network is not needed.

Also, the capacity of the home operator network in a region may vary based on the time of day. For example, in the financial district of San Francisco, a home operator may face capacity issues during work hours, but not after hours. With conventional client based systems, the mobile device will choose to offload data to the visited operator regardless of the time of day, even though it may not be needed after work hours.

The home operator may also renegotiate roaming agreements, as well as upgrade their cellular networks. In some cases, it may no longer make sense for home operators to continue to offload data in a region. Conventional client based systems do not offer the capability to dynamically change network selection policy based on these changes.

The embodiments described herein provide a network based policy solution that allows service providers to specify where, when, and under what network conditions to offload data to a wireless network. The embodiments work with currently available mobile devices without requiring modification to the device. The embodiments allow operators to execute roaming policy instantaneously based on real-time characteristics such as mobile device attributes (location, time of day) and network attributes (cellular network conditions, wireless local area network (WLAN) performance). In one embodiment, the operators only need to provide their roaming policy to a cloud-based authentication proxy and there is no need for any new network infrastructure.

Referring now to the drawings, and first to FIG. 1, an example of a network in which embodiments described herein may be implemented is shown. For simplification, only a small number of nodes are shown in a communication system. The communication system includes a wireless local area network (WLAN) (e.g., Wi-Fi network) 10 and cellular network 15 in communication with a network (e.g., Internet) 16. Mobile devices (wireless devices, client devices, user devices, endpoints) 20 can connect to network 16 via WLAN 10 or cellular network 15. For example, the mobile device 20 may be in communication with network 16 via cellular network 15 in a region in which coverage provided by WLAN 10 (visited operator) overlaps with the cellular coverage provided by the cellular network (home operator).

The WLAN 10 is also in communication with an authentication proxy 12 at a virtual wireless network 25. The authentication proxy 12 includes a policy filter (authentication policy enforcement filter) 30 operable to enforce a policy that specifies whether or not mobile data for the mobile device 20 should be offloaded from cellular network 15 to wireless network 10. The authentication proxy 12 is in communication with a plurality of service provider nodes 24 operable to provide a service provider policy to the policy filter 30 and authenticate the mobile device 20 if the policy allows for offloading of mobile services. The cellular network 15 may be associated with one or more of the service providers 24.

As described in detail below, the wireless network 10 inserts mobile device and network attributes into an authentication request received from the mobile device 20 and transmits request 28 to the authentication proxy 12. Based on service provider policies and the attributes in the request 28, the policy filter 30 determines whether or not the mobile device's request to access the wireless network 10 should be forwarded to the service provider 24 for authentication.

The mobile device 20 may be any suitable equipment that supports wireless communication, including for example, a mobile phone, personal digital assistant, portable computing device, laptop, tablet, multimedia device, or any other wireless device. The mobile device 20 is configured for wireless communication with WLAN 10 according to a wireless network communication protocol such as IEEE 802.11/Wi-Fi, and cellular network 15 according to a cellular wireless standard such as 3G/4G (third generation/fourth generation of cellular wireless standards). The mobile devices 20 may also communicate in accordance with IEEE 802.11u and Hotspot 2.0. It is to be understood that these protocols and standards are only examples and the mobile devices 20 may be configured for communication with networks 10, 15 according to other protocols and standards. The mobile device 20 comprises a Wi-Fi connection manager (not shown), which may include, for example, an IEEE 802.1x supplicant. The supplicant is a security entity located at the client device, which may communicate with and an authenticator (security entity) located at an authentication device (e.g., service provider node 24).

The wireless network 10 may be located at a network site (e.g., enterprise) such as a retail store, hotel, healthcare entity, entertainment center, restaurant, shopping center, education center, corporate headquarter, branch office, campus environment, or any other site offering wireless (e.g., Wi-Fi) network access. The network site may be, for example, a wireless LAN hotspot providing service to one or more Internet Service Providers (ISPs).

The WLAN 10 includes a wireless controller 14 in communication with the authentication proxy 12. The term 'wireless controller' as used herein may refer to a mobility controller, wireless control device, wireless control system, access point, identity services engine, mobility services engine, radio resource manager, or any other network device operable to generate an authentication request based on a connection request received from the mobile device 20. The wireless controller 14 may be in communication with one or more networks (e.g., local area network, private network, virtual private network, wireless local area network) at the network site or another location. The wireless controller 14 includes one or more processor, memory, and interfaces, as described below with respect to FIG. 2. The wireless controller 14 may be, for example, a standalone device or a rack-mounted appliance.

The wireless controller 14 includes a network based roaming module 22 operable to insert mobile device and network attributes into an authentication (connection) request received from the mobile device 20 and forward the request 28 to the authentication proxy 12. The network 10 may also include a wireless control system or other platform for centralized wireless LAN planning, configuration, and management.

In one embodiment, the wireless controller 14 enables system wide functions for wireless applications and may support any number of access points (APs) 18 in the network 10. In the example shown in FIG. 1, the wireless controller 14 is in wired communication with one access point 18 for wireless communication with any number of mobile devices 20 via the wireless network 10. The wireless network 10 may include any number of access points 18 and each access point 18 may serve any number of client devices 20. In the example shown in FIG. 1, the wireless controller 14 and access points 18 are separate devices. The wireless controller 14 may also be integrated with the access point 18 (e.g., autonomous AP).

In one embodiment, the access point 18 includes a cellular client (module) 21 operable to provide attributes of the cellular network 15 to the wireless controller 14 for insertion into the authentication request 28. The cellular client 21 provides real-time information for the cellular network 15. The cellular client 21 may reside at any component within the wireless network 10 or in communication with the wireless controller 14. In addition to the cellular client 21, the policy filter 30 may also provide an interface to the network as another source for providing a status of the cellular network 15.

The WLAN 10 and authentication proxy 12 may communicate via network 16 or any other network. The network 16 may include one or more networks (e.g., Internet, intranet, local area network, wireless local area network, cellular network, metropolitan area network, wide area network, satellite network, radio access network, public switched network, virtual private network, or any other network or combination thereof). Communication paths between the WLAN 10 and authentication proxy 12 may include any number or type of intermediate nodes (e.g., routers, switches, gateways, or other network devices), which facilitate passage of data between the network site and proxy.

In one embodiment, the wireless controller 14 communicates with the authentication proxy 12 over a tunnel with endpoints at the wireless controller 14 and authentication proxy. The wireless controller 14 automatically sets up the secure tunnel to the authentication proxy 12 and authentication requests 28 are automatically forwarded over the tunnel to the authentication proxy. The authentication proxy 12 and wireless controller 14 may communicate, for example, over a VPN (virtual private network) using RADIUS (Remote Authentication Dial-In User Service) over IPsec (Internet Protocol security), or other communication protocols. Various authentication protocols may be used including, for example, EAP (Extensible Authentication Protocol), EAP-FAST (Flexible Authentication via Secure Tunneling), or any other protocol.

The authentication proxy 12 acts as an intermediary to proxy authentication requests between the wireless network 10 and the service provider 24 associated with the mobile device 20 requesting Wi-Fi access to the network. The authentication proxy 12 may aggregate requests 28 received from wireless controllers 14, which have passed through the policy filter 30, and forward the requests directly to the service providers 24.

The authentication proxy 12 may be in communication with any number of service provider nodes 24. The term 'service provider' as used herein may refer to a mobile operator (e.g., home operator, home agent, mobile host), Wi-Fi service provider, or any other provider of mobile services. The communication path between the authentication proxy 12 and service provider 24 may include any number or type of intermediate nodes or networks.

The service provider node 24 may comprise an AAA (authentication, authorization, and accounting) server or any other network device configured to authenticate mobile devices 20 associated with the service provider. The service provider 24 responds to the request 28 with an access-accept packet if the mobile device 20 is authenticated and allowed access, or an access-deny response if the mobile device is denied access. The authentication proxy 12 forwards the response to the wireless network 10.

The authentication proxy 12 may be, for example, a server such as Cisco Access Registrar, available from Cisco Systems, Inc. of San Jose, Calif., or any other vendor network device operable to provide a proxy service. The authentication proxy 12 may be configured, for example, to provide one or more authentication, authorization, or accounting proxy functions. Thus, the term 'authentication' as used herein may refer to any process performed in response to receiving a request from a user device to access (connect to) a network.

In one embodiment, the authentication proxy 12 is located at global enterprise Wi-Fi guest access network (virtual wireless network) 25. The virtual wireless network 25 is configured to enable the network site 10 to accept credentials from the mobile device 20 and provision credentials on the mobile device. There may be any number of wireless networks 10 in communication with the virtual Wi-Fi network 25, which aggregates these individual wireless (Wi-Fi) networks into a global virtual Wi-Fi network and makes it available to mobile operators 24 for offloading their traffic. Each network 10 configures their wireless controller 14 to direct requests to the virtual wireless network 25 for guest access and adds mobile device and network attributes (described below) to the credentials being presented to the virtual wireless network. The authentication proxy 12 may be located remote from the wireless network 10 as shown in FIG. 1 or located at one or more of the network sites.

The policy filter 30 includes an interface to the service providers 24 that allows policy to be set dynamically on the virtual Wi-Fi network 25. There may be multiple policy filters 30 at the proxy 12. For example, a policy filter 30 may be defined and applied to each authentication domain, and for each authentication domain multiple geographic zones may be defined, with separate filters for each geographic zone.

It is to be understood that the network shown in FIG. 1 and described herein is only an example and that other networks having different components or configurations may be used, without departing from the scope of the embodiments. For example, the authentication proxy 12 may be in communication with any number of service providers 24 or wireless controllers 14 at any number of wireless networks 10. For simplification, only one WLAN 10 and wireless controller 14 are shown. There may also be any number of cellular networks 15 associated with the service providers 24.

Figure 2:
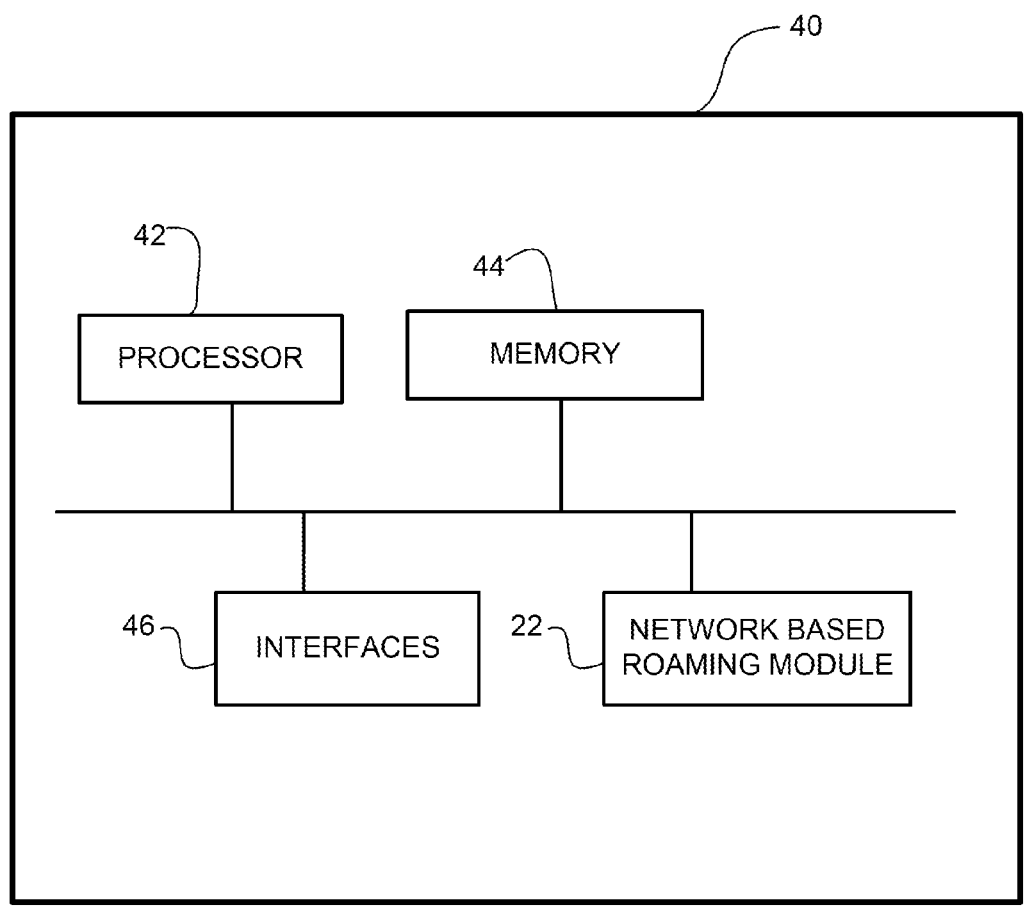
FIG. 2 depicts an example of a network device useful in implementing embodiments described herein.

FIG. 2 illustrates an example of a network device 40 (e.g., wireless controller) that may be used to implement the embodiments described herein. In one embodiment, the network device 40 is a programmable machine that may be implemented in hardware, software, or any combination thereof. The network device 40 includes one or more processor 42, memory 44, network interfaces 46, and network based roaming module 22.

Memory 44 may be a volatile memory or non-volatile storage, which stores various applications, operating systems, modules, and data for execution and use by the processor 42. Memory 44 may store authentication states for one or more mobile devices 20 based on authentication responses received from the authentication proxy 12. For example, if an authentication request is allowed by the service provider 24, an indication of the authentication of the mobile device 20 may be stored in memory 44, for use in enabling Wi-Fi access for the mobile device at the network site 10. Memory 44 may also store, at least temporarily, one or more attributes received from the cellular client 21, access point 18, or mobile device 20.

Logic may be encoded in one or more tangible media for execution by the processor 42. For example, the processor 42 may execute codes stored in a computer-readable medium such as memory 44. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interfaces 46 may comprise any number of interfaces (linecards, ports) for receiving data or transmitting data to other devices. The network interfaces 46 may include, for example, an Ethernet interface for connection to a computer or network.

The network based roaming module 22 may comprise computer code, logic, or other device or mechanism. For example, the roaming module 22 may comprise computer code stored in memory 44. The network based roaming module 22 is configured to insert mobile device and network attributes (described below) into authentication requests received from the mobile devices 20 and forward the requests 28 to the authentication proxy 12.

It is to be understood that the network device 40 shown in FIG. 2 and described above is only an example and that different configurations of network devices may be used. For example, the network device 40 may further include any suitable combination of hardware, software, algorithms, processors, devices, components, or elements operable to facilitate the capabilities described herein.

As described above, the wireless controller 14 inserts mobile device and network attributes into the authentication request 28 transmitted to the authentication proxy 12 (FIG. 1). The attributes inserted into the authentication request 28 may include any type of characteristics, properties, or state, such as mobile device attributes (e.g., geographic location, time of day), cellular network attributes (e.g., cellular load, cellular coverage), and wireless local area network (WLAN) attributes (e.g., quality, performance) or any combination of these or other attributes.

The geographic location may indicate, for example, the physical location of the access point 18 that received the request from the mobile device 20 or the general location of the mobile device (e.g., based on triangulation, GPS (Global Positioning System) or other location tracking technology). The geographic location may also be a region or zone.

The time of day may be the actual time at which the access point 18 received the request from the mobile device 20 (or the mobile device transmitted the request), or a time range (e.g., morning, afternoon, evening) that the request was transmitted or received at the access point 18 or wireless controller 14.

The WLAN network attributes may include, for example, RF (radio frequency) or other performance parameters. The WLAN attributes may also identify the Internet backhaul (service provider) associated with the wireless network.

The cellular network attributes may include, for example, current cellular load and cellular coverage for the cellular network 15 as identified by the cellular client 21 located at the AP 18 or other network device.

It is to be understood that the attributes described above are only examples, and that the policy filter 30 may be configured to filter requests based on one or more of these or other attributes.

Figure 3:
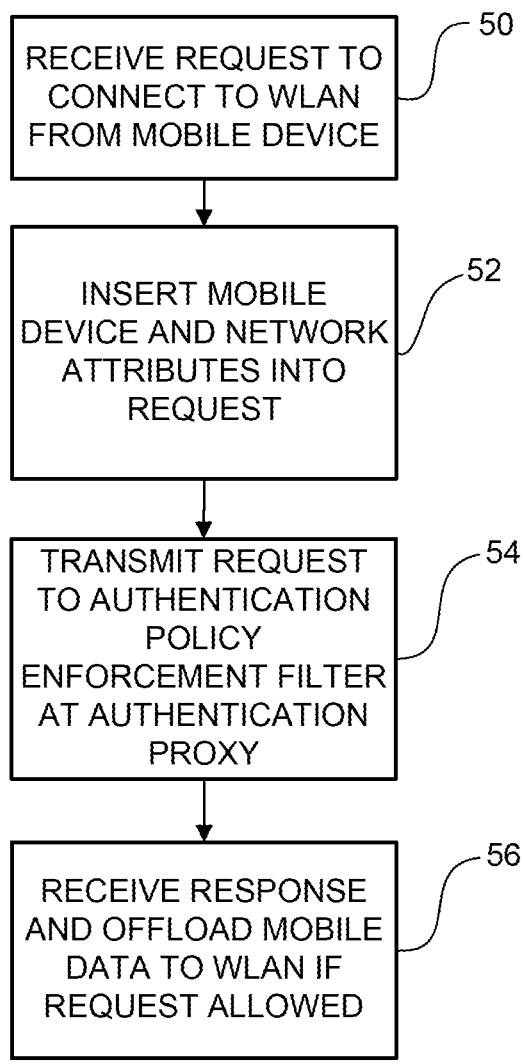
FIG. 3 is a flowchart illustrating an overview of a process for network based on demand wireless roaming, in accordance with one embodiment.

FIG. 3 is a flowchart illustrating an example of a process at wireless controller 14 for network based on demand wireless roaming, in accordance with one embodiment. At step 50, a network device (e.g., wireless controller 14) receives a request (e.g., Wi-Fi authentication request) from a mobile device 20 to connect to the wireless local area network 10. The mobile device 20 may also be in communication with cellular network 15, as shown in FIG. 1. The request may include a network access identifier stored at the mobile device 20 and credentials assigned to the mobile device user by the mobile operator. The credentials may include, for example, an SSID (service set identifier), SIM (subscriber identity module), user password, or any combination of these or other credentials. The credentials are typically encrypted and forwarded to the service provider 24 in their encrypted state.

The wireless controller 14 inserts mobile device attributes and network attributes (e.g., WLAN attributes, cellular network attributes, or both) into the authentication request (step 52). As previously described, the attributes may be provided, for example, by access point 18, which includes a cellular client 21 configured to obtain network attributes (e.g., cellular coverage, cellular load) from cellular network 15. The wireless controller 14 transmits the request 28 with the attributes to the authentication proxy 12, which comprises authentication policy enforcement filter 30 (step 54).

The filter 30 is configured to filter requests 28 received at the authentication proxy 12 based on the attributes and a network policy for offloading mobile data to the wireless local area network 10. The policy filter 30 identifies whether the request should be filtered (e.g., dropped) or forwarded to the appropriate service provider 24 for authentication. The policy filter 30 applies a network policy set by the service provider 24 and uses the attributes received in the request 28 to determine whether or not the request should be filtered.

If the request is denied by the policy filter 30, based on the service provider policy and mobile device and network attributes, the authentication proxy 12 may respond to the authentication request and transmit an access-deny response to the wireless controller, or drop the request.

If the request is allowed to pass through the policy filter 30, based on the service provider policy and mobile device and network attributes, the proxy 12 forwards the request to the appropriate service provider 24. If the mobile device 20 is authenticated by the authentication server at the service provider 24, the proxy 12 receives an access-accept response from the service provider. If authentication is denied, the service provider 24 transmits an access-deny response. The proxy 12 forwards the response from the service provider 24 to the wireless controller 14. If the request is allowed, the wireless controller 14 receives the access-accept response and allows the mobile device to access the wireless network 10, thereby offloading mobile data to the wireless local area network (step 56).

It is to be understood that the process illustrated in FIG. 3 is only an example and that steps may be modified or added without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at a wireless controller in a wireless local area network, a request from a mobile device to connect to the wireless local area network, the mobile device in communication with the wireless local area network and a cellular network;
   inserting mobile device and network attributes into said request, and transmitting said request from the wireless controller to an authentication proxy comprising a policy filter, said network attributes comprising cellular network attributes; and
   receiving a response to said request and offloading mobile data from the cellular network to the wireless local area network when said request is allowed;
   wherein the policy filter is configured to filter requests received at the authentication proxy based on said attributes and a network policy for offloading mobile data from the cellular network to the wireless local area network; and
   wherein the authentication proxy is located at a virtual wireless local area network configured to aggregate a plurality of wireless local area networks.

2. The method of claim 1 wherein the wireless controller receives said cellular network attributes from a cellular client located in the wireless local area network.

3. The method of claim 1 wherein the authentication proxy is configured to forward said requests that have not been filtered by the policy filter to a service provider authentication device.

4. The method of claim 1 wherein said mobile device attributes comprise a time of day and a geographic location.

5. The method of claim 1 wherein said network attributes comprise attributes for the wireless local area network and a cellular network transmitting data to the mobile device.

6. The method of claim 1 wherein said network attributes comprise performance parameters for the wireless local area network.

7. The method of claim 1 wherein said network attributes comprise cellular load and cellular coverage for a cellular network transmitting data to the mobile device.

8. The method of claim 1 wherein the policy filter comprises a plurality of policy filters, each associated with an authentication domain and a geographic zone.

9. The method of claim 1 wherein the wireless controller communicates with the authentication proxy over a tunnel with endpoints at the wireless controller and the authentication proxy.

10. The method of claim 1 wherein the authentication proxy comprises an AAA (Authentication, Authorization, and Accounting) server.

11. The method of claim 1 wherein said request comprises an identifier stored at the mobile device.

12. The method of claim 1 wherein said network policy comprises a service provider network policy that identifies under what network conditions to offload to wireless local area network.

13. An apparatus comprising:
   a network based roaming module for receiving a request from a mobile device to connect to a wireless local area network, inserting mobile device and network attributes into said request, transmitting said request to an authentication proxy comprising a policy filter, and receiving a response to said request and offloading mobile data to the wireless local area network if said request is allowed; and
   memory for storing said attributes;
   wherein the policy filter is configured to filter requests received at the authentication proxy based on said attributes and a network policy for offloading mobile data from a cellular network to the wireless local area network, the network based roaming module is configured for operation in the wireless local area network and said network attributes comprise cellular network attributes, and the authentication proxy is located at a virtual wireless local area network configured to aggregate a plurality of wireless local area networks.

14. The apparatus of claim 13 wherein said mobile device attributes comprise a time of day and a geographic location.

15. The apparatus of claim 13 wherein said network attributes comprise attributes for the wireless local area network and a cellular network transmitting data to the mobile device.

16. The apparatus of claim 13 wherein said network attributes comprise performance parameters for the wireless local area network.

17. The apparatus of claim 13 wherein said network attributes comprise cellular load and cellular coverage for a cellular network transmitting data to the mobile device.

18. An apparatus comprising:
   an authentication proxy for receiving authentication requests from a wireless local area network, said requests comprising mobile device and network attributes;
   a policy filter configured to filter said requests based on said attributes and a network policy for offloading mobile data from a cellular network to the wireless local area network; and
   an interface for communication with a service provider node operable to authenticate said requests and set said network policy at the policy filter;
   wherein said attributes comprise cellular network attributes; and
   wherein the authentication proxy is configured for operation at a virtual wireless local area network configured to aggregate a plurality of wireless local area networks.

19. The apparatus of claim 18 wherein said mobile device attributes comprise a time of day and a geographic location and said network attributes comprise cellular network conditions.

* * * * *